Nov. 18, 1930.  D. G. COPLEN  1,782,134
SAFETY EQUIPMENT FOR AIRCRAFT
Filed Aug. 8, 1928  4 Sheets-Sheet 4
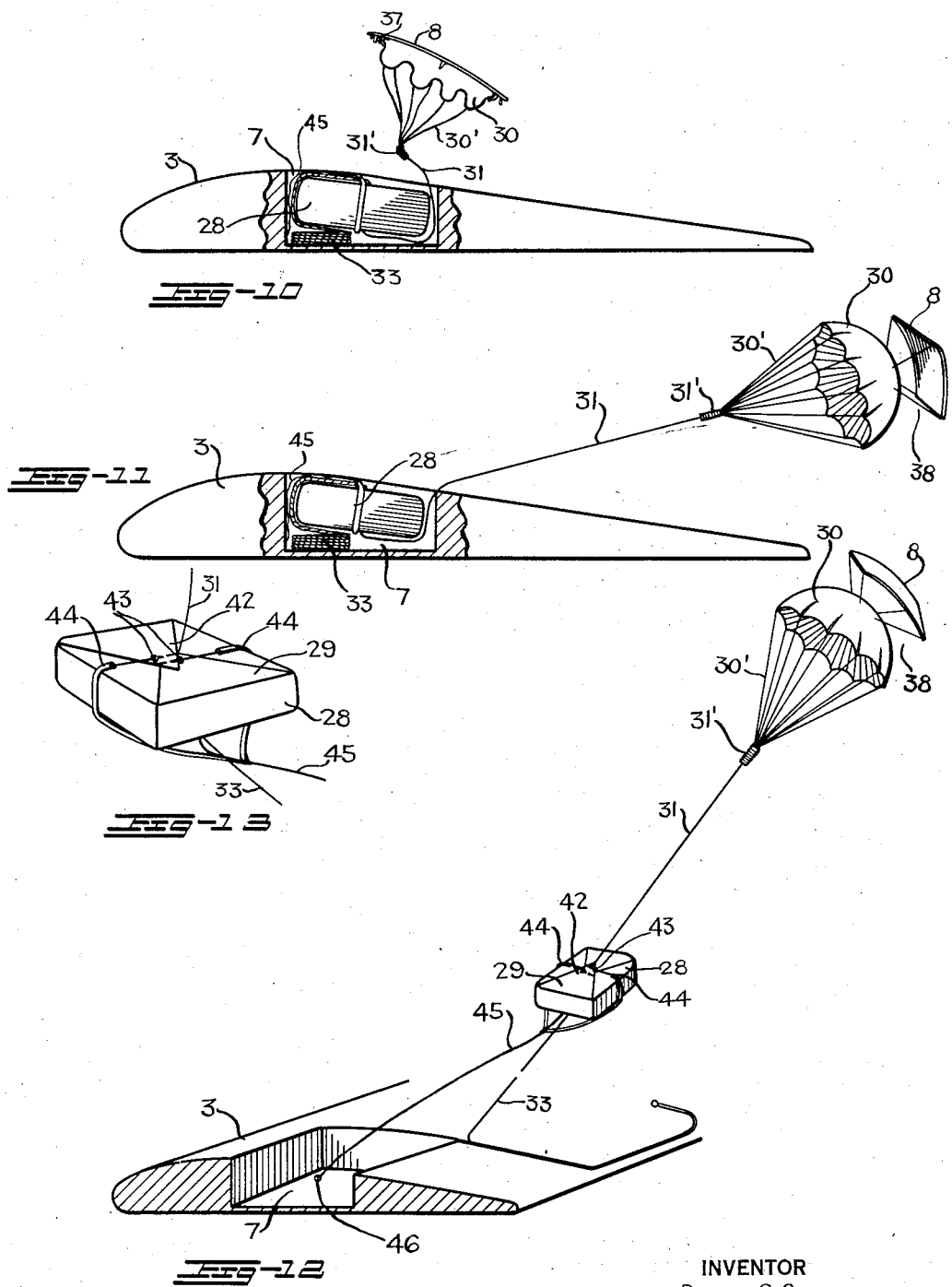
INVENTOR
DONALD G. COPLEN
BY
Cook & Robinson
ATTORNEY Patented Nov. 18, 1930

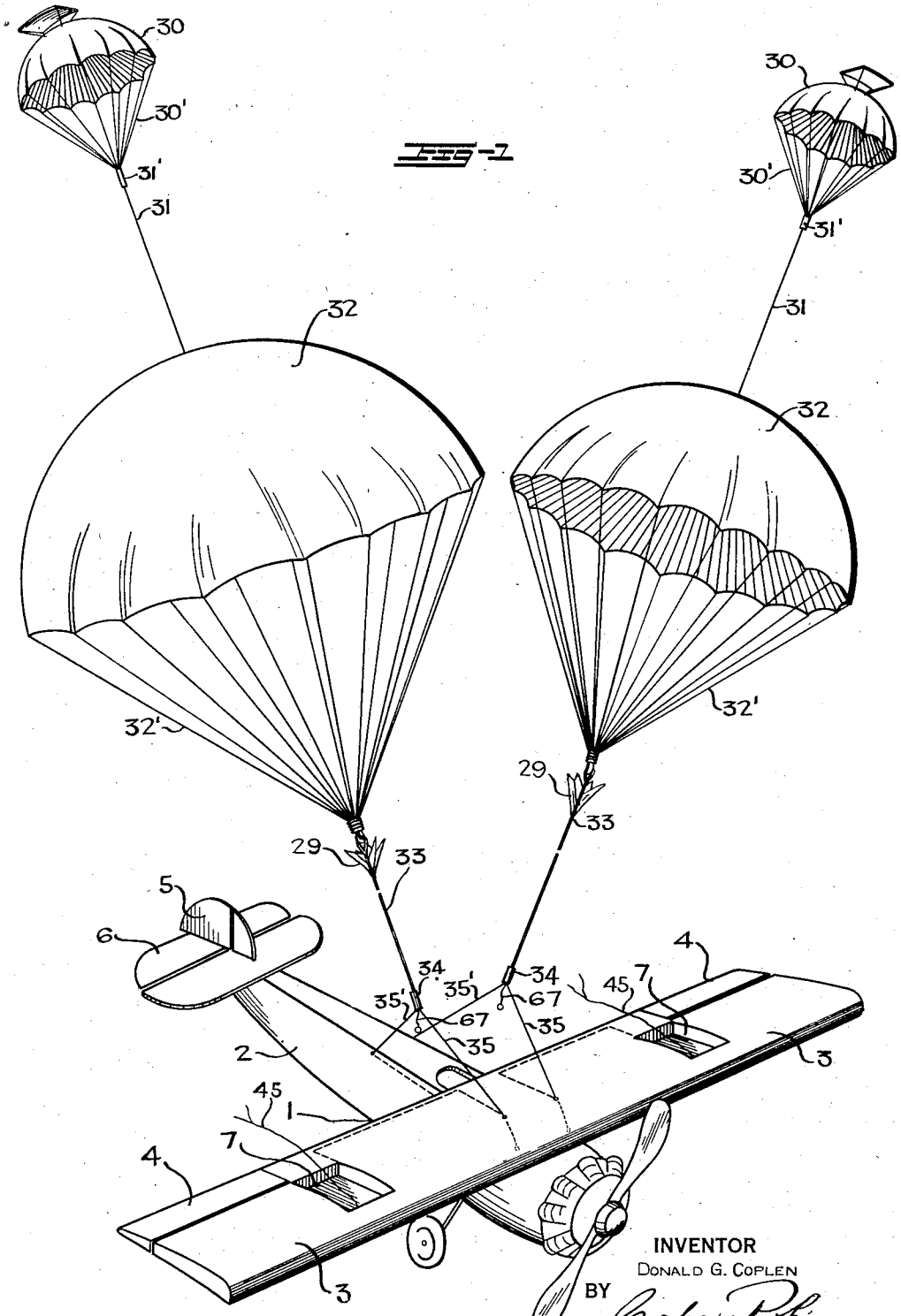

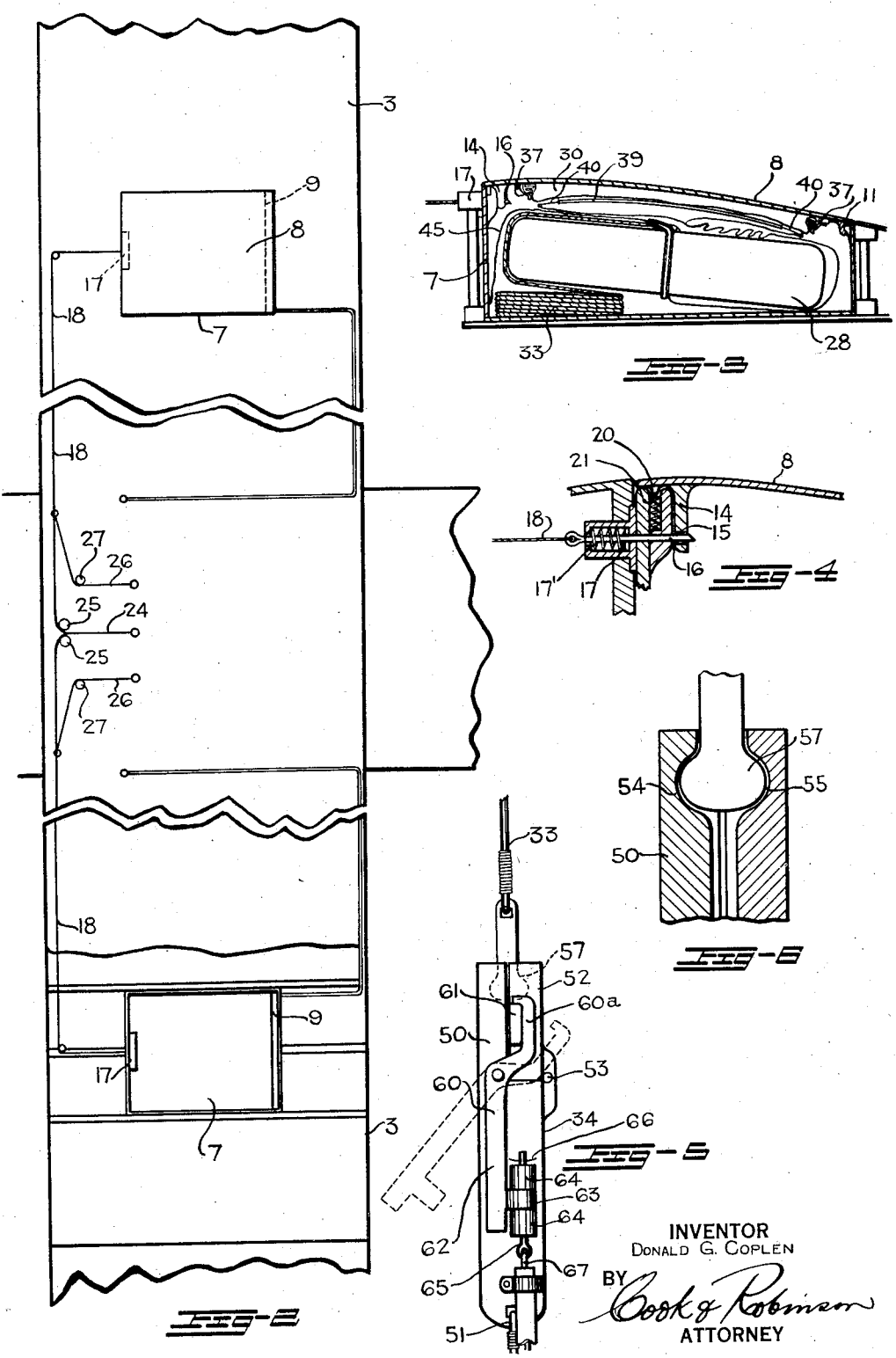

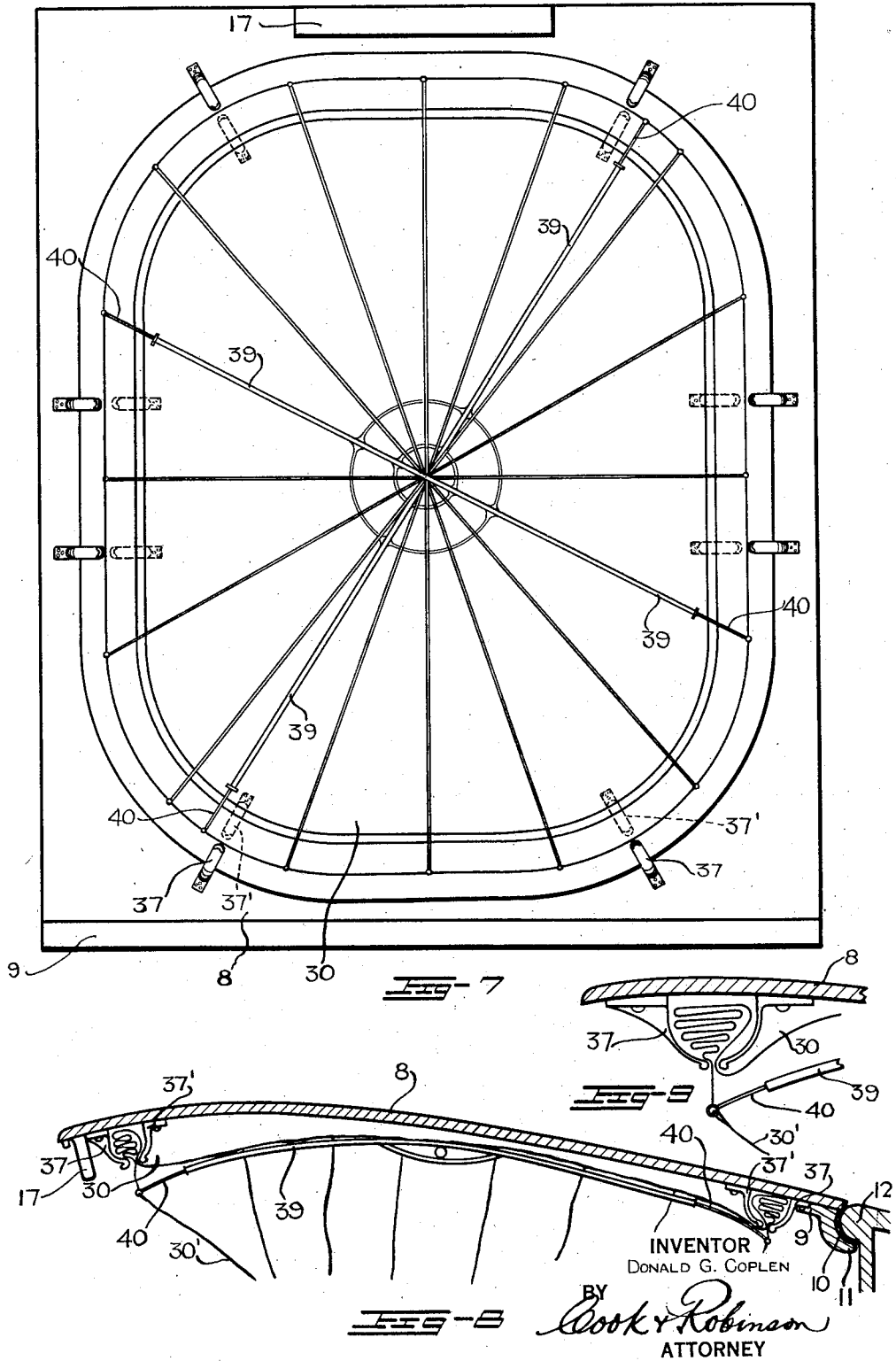

1,782,134

UNITED STATES PATENT OFFICE

DONALD G. COPLEN, OF SEATTLE, WASHINGTON

SAFETY EQUIPMENT FOR AIRCRAFT

Application filed August 8, 1928. Serial No. 298,280.

This invention relates to safety equipment for aircraft, and particularly to parachute equipment for use with airplanes whereby safe landings may be made in cases of emergency.

The principal object of the present invention is to provide airplanes with compartments, or housings, within which parachutes may be stored ready for use and from which the parachutes may be withdrawn for the purpose of sustaining the plane in a controlable position for safe landing.

More specifically, the present invention resides in the provision in an airplane of one or more compartments, preferably located in the wings and opening through the top surfaces thereof and within which parachutes, suitable for landing a plane, are stored in properly folded packs; the said compartments also being provided with lids normally held in place by latch devices but which will be instantly withdrawn and outwardly displaced clear of the plane by air suction or by the aid of mechanical devices when their latches are released so as to open the compartments for the withdrawal of the parachutes. Also, to provide pilot parachutes which are normally contained in said compartments but which will be carried out with the lids when the latter are released and which are so connected with the main parachute packs as to withdraw them sufficiently past the tail surfaces and other parts of the airplane and to then cause them to be opened up for sustaining the plane in position for safe landing.

Another object of the invention is to provide novel means for attaching the pilot parachutes to the compartment lids, so that they will be held properly in position for opening and so that they may be easily detached therefrom after they have been carried by the lid to a position for opening.

Another object is to provide novel means whereby the parachute compartments may be selectively or simultaneously opened.

A still further object of the invention resides in the novel manner of attaching the main parachutes to the plane so as to sustain the latter in position for safe landing. Also, in the disposition of the attaching cables so as to prevent their fouling on the fuselage and tail surfaces.

It is also an object of the invention to provide release latches of novel construction, whereby the parachutes may be entirely detached from the airplane when this is desired.

Other objects of the invention reside in the various details of construction and in the combination of parts and in their mode of operation, as will hereinafter be described.

In accomplishing these and other objects of the invention, I have provided the improved details of construction the preferred forms of which are illustrated in the accompanying drawings, wherein—

Figure 1 is a perspective view of an airplane equipped with parachutes in accordance with the details of the present invention, showing the parachutes in use.

Figure 2 is a fragmental, plan view of the upper wing section of the plane, with parts broken away to better show the parachute compartments in the wings and the arrangement of the lid releasing cables.

Figure 3 is a cross sectional view of one of the parachute compartments, with the parachutes contained therein ready for use.

Figure 4 is a detail section, showing one of the lid latches.

Figure 5 is a side view of the parachute disconnecting means.

Figure 6 is a detail section of a part of the same.

Figure 7 is an enlarged, underside view of one of the parachute compartment lids, showing the pilot parachute as attached thereto.

Figure 8 is a cross sectional view of the same.

Figure 9 is a detail of one of the pilot parachute attaching clips fixed to the underside of the lid.

Figures 10, 11 and 12 are views illustrating successive positions of the pilot and main parachutes after the compartment lid is released until the main parachute pack is in position to be opened.

Figure 13 is a perspective view of the main parachute pack in its envelope before the latter is opened.

Referring more in detail to the drawings— 1 designates, in its entirety, an airplane of a common type and comprising a fuselage 2, wings 3—3, ailerons 4, rudders 5 and elevators 6. The present invention relates to the provision of parachutes for landing the plane in cases of emergency and the provision of compartments for containing the parachutes and means for withdrawing the parachutes from the compartments for use. Although one or more parachutes could be used for this purpose, it has been found practical to use two parachutes, for the reason that in so doing spinning of the plane is avoided and the plane will be sustained more evenly in position for proper and safe landing. In the present arrangement, I have provided the parachute containing housings, or compartments, 7 in the wings 3. These compartments are located quite a way out from the fuselage and near the inner ends of the ailerons, and they are equipped with lids 8 adapted to open upwardly; the latter conforming in shape to the curvature of the wings and, when closed, serving as integral parts of the wing surface.

It is to be understood that I do not wish in the arrangement shown to be confined to this particular location of the parachute compartments since they could, if desired, be placed in other parts of the plane, such as on the underside of the wings or in the fuselage, but it is believed that the locations as here illustrated are the most desirable from a practical standpoint. It is also to be understood that while I have shown two of such compartments, one or more compartments could be used, dependent on the location and on the number of parachutes to be used.

The lids 8 are provided along their rearward edges with downwardly projecting attaching rails 9, as shown in Figure 8, each formed with a longitudinally extending and rounded groove 10 and an outwardly directed lip 11 below the groove, and each of the compartments is provided along the top of its rear edge with a rounded rib or flange 12 that is adapted to seat within the groove 10 when the compartment lid is in closed position to hold this edge of the lid against upward displacement. Also, at the forward edge of each lid, as in Figure 4, is a downwardly extending flange 14 having an opening 15 therein for receiving the inner end of the locking bolt 16 of a latch 17 that is mounted on the forward wall of the compartment. The bolt 16 is urged inwardly to locking position by means of a coiled spring 17', but may be pulled outwardly against the tension of the spring by a cable 18 attached to the outer end of the bolt. When the lids 8 are in place over the compartments, their rearward edges are held in place by the cooperation of rails 9 and ribs 12 and their forward edges are held in place by the latches 17 so that the top surfaces of the lids are flush with the top wing surfaces. On releasing a latch 17 during flight of the plane, the lid which it held will normally be drawn upwardly due to suction of air and to insure such opening of the lid when the latch is released, I have provided compression springs 20 placed in bores 21 in the latches, as shown in Figure 4, which will push the lid upwardly sufficiently that its forward edge will catch the air current and this will cause the lid to swing upwardly and pivotally on the flange 12 and then fly rearwardly clear of the plane.

In Figure 2 I have shown the preferred arrangement of cables whereby either lid may be released separately or whereby both lids may be released simultaneously. As shown, the cables 18 which are attached to the latch bolts 16 for withdrawing them, extend to a point in the central plane of the fuselage and are there joined together, or they are formed as a continuous cable to which a draw cable 24 operating between two closely spaced guide pulleys 25—25 is attached. The cable 24 extends to a position accessible to the pilot of the plane, or accessible to one in the operator's seat. Also, at opposite sides of the cable 24, are cables 26 which extend from a position accessible to the operator over guide pulleys 27 and then laterally for connection, respectively, with the cables 18 at points spaced outwardly from the pulleys 25. This arrangement of cables provides that by drawing in on either of the cables 26 the cable 18 with which they are attached will be drawn in without effecting the other cable 18 and, in this way, a selected compartment may be opened; or, if the cable 24 is drawn in, both of the cables 18 will simultaneously be drawn in to open both compartments together. It will be here stated that it is intended that the cables 18 and 26 be operatively contained in tubular housings to insure them against fouling or being caught or held incident to any circumstance that might otherwise hinder operation.

The compartments 7 are of such size that a parachute of considerable size may be contained within each of them, together with a pilot parachute and the attaching cables. The main parachutes 32 in this instance, would be of sufficient size that together they would be capable of sustaining the plane for safe landing, and the pilot parachutes would be of such size that they are capable of withdrawing the main parachutes from their compartments and carrying them clear of the plane for opening. As illustrated in Figure 3, each of the main parachutes is properly folded to form a pack 28 of suitable shape for fitting in its compartment, and each pack is contained within a removable fabric envelope 29. The pilot parachutes 30 are releasably supported from the compartment lids so that when the latter are released and blown off, the pilot parachutes are carried out with them and, upon opening, they draw out the main parachute packs from their compartments.

As best shown in Figures 1, 10, 11 and 12, the shroud cords 30' of the pilot parachutes are attached by suitable swivels 31' to cables 31 which, in turn, are attached to the top central portions of the main parachutes 32, and the shroud cords 32' of the main parachutes are drawn together and attached to cables 33 which are connected, through releasing devices 34 of novel construction, presently described, to paired cables 35—35' in such manner as to hold the plane suspended on an even keel for safe landing. As shown in Figure 1, the cables 35 are extended through the wing structure and are connected to the fuselage slightly forward of the center of gravity of the plane, while the cables 35' are attached to the upper longerons of the fuselage toward their rearward end; the particular point of attachment being a matter of securing proper balance and the method of attaching in this instance would be such as would be perfectly secure and which preferably would permit some resiliency in order to absorb shock incident to opening of the parachutes.

The method of attaching the pilot parachutes to the under sides of the compartment lids 8 is best shown in Figures 7, 8 and 9, wherein 37—37' designate paired clips that are mounted on the under side of each lid. These clips are arranged in pairs about the periphery of each lid, as shown in Figure 7, to receive between them the edge portions of the pilot parachute which is assembled therewith, while the lid is removed from its compartment and placed with its inner side facing upwardly. While the lid is in this position the pilot parachute is placed on the lid with its upper or outside surface against the lid. Then, the edge portions are folded and tucked between the complemental clips, as shown in Figures 8 and 9, so as to leave the edge of the parachute extended slightly from the clips and with the shroud cords 30' drawn to a common point and attached to the cable 31. Preferably the lids would also be connected to the pilot parachutes by four short cords 38 which are of such length that they will hold the lid in a position to cause it to bear to the side and in this way cause the parachute to be guided away from the tail surfaces. Within the pilot parachutes are umbrella-like opening devices, each comprising two semi-rigid, tubular ribs 39 fixed together in crossed relation and fastened centrally within the parachute. Slidable within the tubular ribs and adapted to be withdrawn from the ends of the latter, are wire-like extensions 40 which are connected at their outer ends to the edges of the parachute. When the lid 8 is blown off from its compartment, it carries with it the pilot parachute and, when the shroud cords of the latter are finally drawn taut, they cause the folds of the parachute to be drawn outwardly from between the holding clips and the resilient ribs of the umbrella hold the parachute in open position so that it will be caught up by the air and opened to its full capacity. When so opened, it will be drawn through the air by its connection with the main parachute pack, and this pull withdraws the latter from the compartment.

The main parachutes, when placed in their respective compartments, are folded in suitable manner to form a small, compact pack, and the pack is enclosed in an envelope as shown in Figure 13. This envelope consists of a piece of fabric adapted to inclose the pack and which is provided with flaps as at 42 adapted to be drawn together in overlapped relation from opposite sides of the pack so as to receive one or more attaching pin 43 therethrough to hold the envelope securely about the pack. The pins 43 are arranged so as to be easily withdrawn and they have cords 44 attached thereto for this purpose which are extended to a cable 45 which, in turn, is attached at its end to the bottom of the compartment 7, as at 46. This arrangement provides that after the packs are carried out from their compartments by the pilot parachutes, the cables 45 finally become taut and cause the pins 43 to be pulled from the envelopes to permit opening up of the packs and a resultant opening of the main parachutes.

It is also intended that the envelopes 29 be provided with openings through which the cables 33 may pass and that they be attached to these cables in such manner that they will be retained thereon after being released from about the packs as they are shown in Figure 1.

The releasing devices 34 which join the cables 33 to the cables 35—35' preferably are of the construction shown in Figures 5 and 6. Each device comprises a body section 50 to which, at its lower end as at 51, the cables 35—35' are attached, and to which, at its upper end, a section 52 is hingedly fixed as at 53 and is adapted to be folded against the body 50. The engaging surfaces of the parts 50 and 51 are provided with complemental, registering recesses 54 and 55, as in Figure 6, adapted to hold between them an enlargement 57 on the end of cable 33, so as to connect this cable to the cables 35—35'. On each side of the body 50 is a pivotally attached hook 60 having a part 60ª adapted to holdingly engage lugs 61 on the hinged part 52 to hold the latter closed, as in Figure 5. They also have depending legs 62 provided with apertured lugs 63 adapted to register between similar lugs 64 on the body to receive locking pins 65 normally held in place by soft copper wire keys 66. Pull cords 67 are attached to the pins whereby they may be drawn out upon shearing of the keys to thereby release the hooks to permit release of the pivoted member 52 which, upon opening up, releases the cable enlargement 57.

In arranging the parachutes and cables for use in their compartments, the main parachutes are first properly folded and packed within the envelopes which are then secured by the pins 43. In the inclosing of the packs, the cables 31 to the pilot parachutes are extended between the overlapped flaps of the envelopes while the cables 33 leave the envelopes through suitable openings provided centrally thereof. The cables 35—35′ are then extended from their attaching points on the fuselage along the wing edge, as indicated by the dotted lines in Figure 1, where they are held by applying glued wing tapes, or other suitable means, and are attached by the release device 34 to the cables 33 which enter the compartments at the rear inner corners. These cables 33 are then coiled within the bottom of the compartment in such manner as to prevent fouling when drawn out and the parachute packs are placed thereon, as shown in Figure 10. Then, the pilot parachutes are applied to the covers, or lids, 8 in the manner as previously described and the lids are applied to their compartments and are latched in place.

In the event that an emergency arises and it is desired to use the parachutes for landing the plane, the operator draws inwardly on the cable 24 and this simultaneously releases the lids 8 so that suction of air current passing over the wings, assisted by the springs 20 in the latches, displaces them from the compartments. As soon as they are caught up by the air, they are drawn rearwardly of the plane and carry with them the pilot parachutes. When the cables 31 become taut, they cause the pilot parachutes to be withdrawn from the lids and to be opened up. The drag of the pilot parachutes then draws the main parachute packs from the compartments and carry them clear of the plane. The cables 33 in this instance are of sufficient length to permit this. When the cables 45 become taut, they cause the pins 43 to be withdrawn from the envelopes 29 and this permits the envelopes to open and release the main parachutes which then open up and the various parts quickly assume the position as shown in Figure 1.

With this arrangement, it is readily apparent that opening of the pilot parachutes is positive and that by properly folding the main parachutes and by providing sufficient length of cable between them and the plane, they will be carried clear of the plane and the opening practically insured.

If, during the process of landing in this way, the emergency should be overcome and should the pilot wish to release the parachutes from the plane, this is done by drawing down on the pull cords 67 of the release devices 34 which will open up to release the cables 33 and free the parachutes entirely from the plane.

The present drawings illustrate the arrangement for a certain type of airplane, and it is to be understood that this arrangement might need to be changed for other types, and it is for this reason that I do not wish to be limited exactly to the details as here illustrated. It is aparent that various details could be altered without departing from the spirit of the invention.

What I claim as new and desire to secure by Letters Patent, is:

1. In an airplane or the like, a parachute compartment having a lid that will be outwardly displaced from the plane when released, holding means for normally retaining the lid in closed position, a main parachute collapsed within the compartment and having connection with the airplane for sustaining the latter when the parachute is open, a pilot parachute collapsed within the compartment and having connection with the main parachute for withdrawing the latter from the compartment to a position for opening, means releasably supporting the pilot parachute from the under side of the lid for carrying it therewith from the compartment to a position for opening when said lid is displaced and means for actuating said holding means to release the lid.

2. In an airplane or the like, a parachute storage compartment having a releasable lid adapted to be displaced outwardly from the plane when released, holding means for normally retaining the lid in closed position, a main parachute collapsed within the compartment and having connection with the airplane for sustaining the latter when the parachute is open, a pilot parachute collapsed within the compartment and connected with the main parachute for withdrawing the latter from the compartment, yieldable devices for supporting the pilot parachute from the under side of the lid and whereby said pilot parachute will be carried with the lid when the latter is released to a position for opening and from which it will be withdrawn through its connection with the main parachute.

3. In an airplane or the like, a parachute storage compartment having a releasable lid that will be outwardly displaced from the plane when released, holding means normally retaining the lid in closed position, a main parachute collapsed within the compartment and having a connection with the airplane for sustaining the latter when the parachute is open, a pilot parachute collapsed within the compartment and connected with the main parachute for withdrawing it from the compartment, a plurality of yieldable clips on the under side of said lid for supporting the pilot parachute in position for opening and whereby the latter will be carried with the lid when it is released to a position for opening and from which clips it will be withdrawn through its connecting means with the main parachute, and means operable to actuate the lid holding means to release the lid from the compartment.

4. An airplane, having compartments formed in the upper wing surfaces at opposite sides of the fuselage, releasable lids fitted to said compartments, means normally retaining said lids in closed positions, parachutes collapsed within said compartments and connected with the airplane for sustaining the latter when the parachutes are opened, a pilot parachute connected with each of the first mentioned parachutes and also collapsed within said compartments, means on the under sides of said lids releasably connecting the pilot parachutes thereto whereby the latter will be drawn out to a position for opening with the lids when the latter are released and from which said pilot parachutes will be withdrawn through their connections with the main parachutes, and means for manually actuating the lid retaining means to release the lids.

5. An airplane having upwardly opening parachute storage compartments in its upper wing surfaces at opposite sides of the fuselage, lids releasably fitted to said compartments to be outwardly displaced from the plane by air when released, a parachute pack disposed within each of said compartments, an elongated cable connecting each of the packs with the plane for sustaining the latter in position for landing when the parachutes are opened, a pilot parachute collapsed within each of the compartments and having elongated cable connections with the parachute packs for withdrawing them to positions for opening, clips on the under sides of said lids releasably gripping the pilot parachutes and for carrying them outwardly with the lids to positions for opening when the lids are displaced, envelopes enclosing the parachute packs and means for releasing the envelopes therefrom after the packs have been carried to positions for safe opening, and means for releasing said lids from their compartments.

Signed at Seattle, Washington, this 26th day of July, 1928.

DONALD G. COPLEN.